Oct. 13, 1942.  W. F. MIRON  2,298,580
FISH-HOLDING DEVICE
Filed June 16, 1938
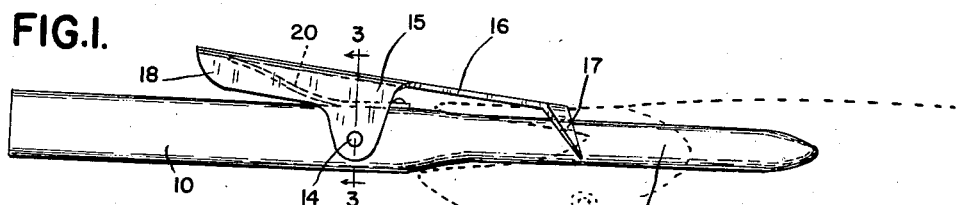
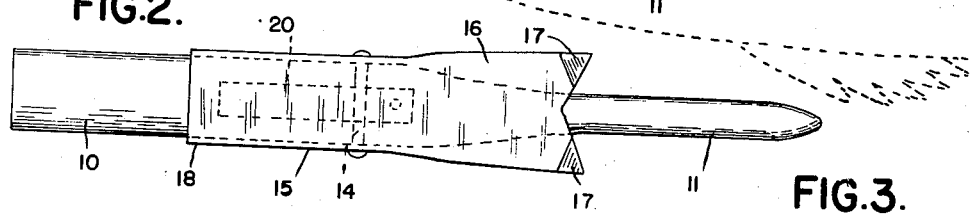
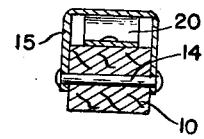
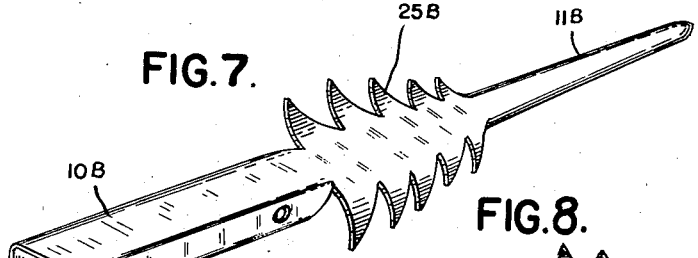
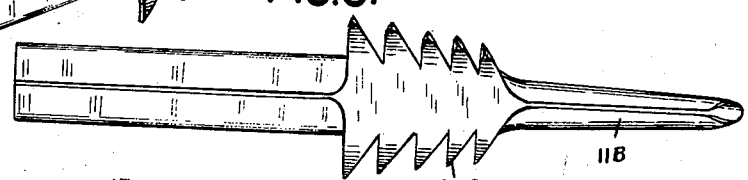
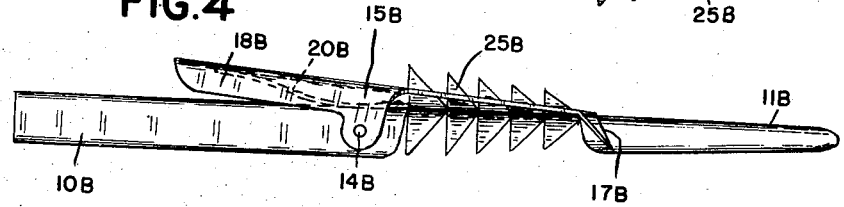
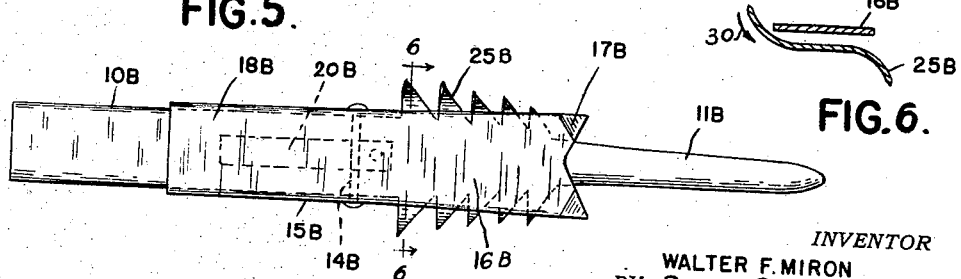
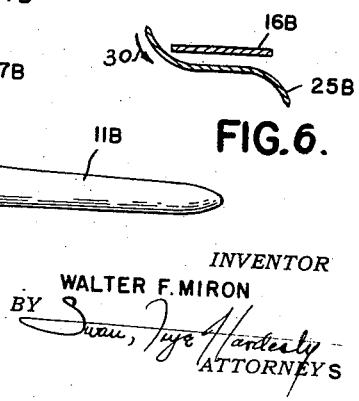
INVENTOR
WALTER F. MIRON
BY
ATTORNEYS Patented Oct. 13, 1942

2,298,580

UNITED STATES PATENT OFFICE 2,298,580

FISH HOLDING DEVICE

Walter F. Miron, Detroit, Mich.

Application June 16, 1938, Serial No. 214,083

2 Claims. (Cl. 17—8)

This invention relates to devices for holding fish, to facilitate handling thereof, as in cleaning and scaling operations, and aims to provide a simple, sanitary and easily attachable and removable device of this character which is capable of securely gripping fish of different sizes and shapes, and allows them to be firmly held and easily worked upon.

Other objects and advantages will be apparent from the following description, wherein reference is made to the accompanying drawing illustrating preferred embodiments of my invention and wherein similar reference numerals designate similar parts throughout the several views.

In the drawing:

Fig. 1 is a side elevational view of a preferred form of the device, indicating in dotted lines the manner of use thereof.

Fig. 2 is a plan view of the device.

Fig. 3 is a sectional view taken substantially on the line 3—3 of Fig. 1 and looking in the direction of the arrows.

Figs. 4 and 5 are side and plan views, respectively, corresponding to Figs. 1 and 2, of another somewhat modified construction.

Fig. 6 is a cross sectional view taken substantially on the line 6—6 of Fig. 5 and looking in the direction of the arrows.

Fig. 7 is a perspective view of the body of the device with the external gripping element removed; and Fig. 8 is a bottom plan view of the same.

Referring now to the drawing, and particularly Figs. 1 to 3, reference character 10 designates a handle portion of elongated shape, an integral extension of which comprises a stem 11 somewhat pointed at its extremity and adapted to be thrust into the gullet of a fish. Pivoted to the handle, as by means of the pin 14, is a clamping device, generally designated 15, having a holding jaw portion 16 extending substantially parallel to and part way along the stem 11, and terminating in a pair of pointed teeth 17 which project toward but extend on either side of the stem. The cut-out portion between the teeth is normally forced into engagement with the stem by means of a leaf spring 20, secured to the handle beneath the clamping device and bearing upwardly against the actuating finger piece 18 thereof. The finger piece extends integrally upon the opposite side of the pivot 14, beside the handle portion 10, to enable convenient manipulation of the clamp by the user to the device, who may release the jaw by merely pressing down the finger piece.

The manner in which the device is used will be apparent from an inspection of Fig. 1. It is merely necessary for the workman to open the clamp by pressing down the finger piece 18, and then to thrust the stem portion into the throat of the fish, allowing the clamp to grip the side of the head or jaw, or if desired, behind the gills, whereafter the portion 10 forms a convenient handle by which the fish may be held and turned.

In the modification shown in Figs. 4-8 inclusive the handle and stem portions 10B, 11B, respectively, are also formed as an integral elongated assembly, but they are joined by an intermediate toothed portion 25B of greater width than the intermediate portion of Figs. 1 and 2. The serrated and sharpened teeth are of lesser height near the stem, and higher near the handle end of the device. The assembly is preferably formed of sheet metal, which is rolled to form the handle and stem portions, as best shown in Fig. 8, while the toothed portion is left relatively flat, although toward their ends the teeth are curved in opposite directions about longitudinal axes as best shown in Figs. 6 and 7. The clamping device 15B, pivoted on the handle portion by the pivot 14B comprises a jaw portion 16B which extends beyond the toothed portion 25B and is provided with pointed extremities 17B which engage the stem 11B when not in use, the pointed extremities of the jaw portion being normally depressed by virtue of a leaf spring 20B interposed between the handle portion 10B and that portion of the clamping device 15B rearwardly of the pivot 14B. This rearward portion of the clamping device I have termed a thumb portion or actuating portion, and marked it with the numeral 18B.

The device is inserted by thrusting the stem into the gullet of the fish while making a twisting motion in the direction of the arrow 30 of Fig. 6; the clamp being held from pressing on the fish by pressing upon the thumb portion 18B thereof. The twisting will be seen to prevent the teeth from gripping while the device is being inserted, while when released the teeth grip the fish and assist in preventing the holder from slipping out. When the clamp is also released and allowed to grip the fish, the latter is then held both from inside and outside. In order to remove the holder from the fish it is only necessary to raise the holding jaw portion of the clamp and again rotate the handle in the direction of the arrow 30 while withdrawing it.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. A fish holding implement comprising a rigid elongated stem and handle assembly, a clamping device pivoted thereto having an actuating portion extending adjacent the handle and a gripping portion extending adjacent the stem and movable toward and from the same, and means pivotally connecting the handle and clamping device at a point between the actuating portion and gripping portion of the latter, the stem being thinner than the handle and the gripping portion having laterally spaced teeth adapted to extend on either side of the stem.

2. A fish holding implement comprising a rigid elongated stem and handle assembly, a clamping device pivoted thereto having an actuating portion extending adjacent the handle and a gripping portion extending adjacent the stem and movable toward and from the stem, the stem being thinner than the handle and said gripping portion having laterally spaced teeth adapted to extend on either side of the stem, and a plurality of teeth rigidly carried by the stem and handle assembly and adapted to be projected into the fish with said stem portion, said last mentioned teeth projecting rearwardly with respect to one direction in which the implement may be rotated, whereby the last-mentioned teeth may be made to penetrate the fish by rotating the implement in a reverse direction.

WALTER F. MIRON.